Feb. 12, 1935.   P. M. CHANCELLOR   1,990,525
CENTRIFUGAL CHUCK
Filed July 31, 1933    2 Sheets-Sheet 1

INVENTOR
P. M. Chancellor
By
Hazard and Miller
ATTORNEYS

Feb. 12, 1935.  P. M. CHANCELLOR  1,990,525
CENTRIFUGAL CHUCK
Filed July 31, 1933  2 Sheets-Sheet 2

INVENTOR
P. M. CHANCELLOR
BY
Hazard & Miller
ATTORNEYS

Patented Feb. 12, 1935

1,990,525

UNITED STATES PATENT OFFICE 1,990,525

CENTRIFUGAL CHUCK

Philip M. Chancellor, Chicago, Ill.

Application July 31, 1933, Serial No. 683,032

4 Claims. (Cl. 279—37)

This invention relates to a centrifugal chuck.

An object of the invention is to provide a chuck which may be applied to a lathe spindle or any power driven rotary element which employs the centrifugal forces which may be developed during rotation of the chuck as a means for closing the jaws of the chuck. In this respect the chuck may be regarded as automatic in that an article which is to be mounted in the chuck and turned thereby may be positioned between the jaws of the chuck and the chuck started rotating. As the chuck picks up speed the centrifugal forces developed are operative to close the jaws of the chuck and cause them to firmly grip the article. Obviously, as the speed of rotation increases the greater the centrifugal force that will be developed and, consequently, at high speeds the article will be gripped by the jaws with maximum gripping effort. In the same sense of automatic operation, when the chuck stops its rotation, the jaws are automatically caused to release the article. In this way it is possible to merely apply the article to the chuck, start the rotation of the chuck, and the article will be automatically gripped and turned thereby and subsequently on stopping the chuck the article will be automatically released.

Another object of the invention is to provide a centrifugal chuck which is not only automatic in operation as above explained but which tends to automatically center the article applied to the chuck with respect to the axis of rotation.

A further object of the invention is to provide a chuck of simple, endurable construction, the parts of which cannot easily get out of order but in the event of damage may be easily replaced.

With the foregoing and other objects in view, which will be made manifest in the following detailed description and specifically pointed out in the appended claims, reference is had to the accompanying drawings for an illustrative embodiment of the invention, wherein:

Figure 1:
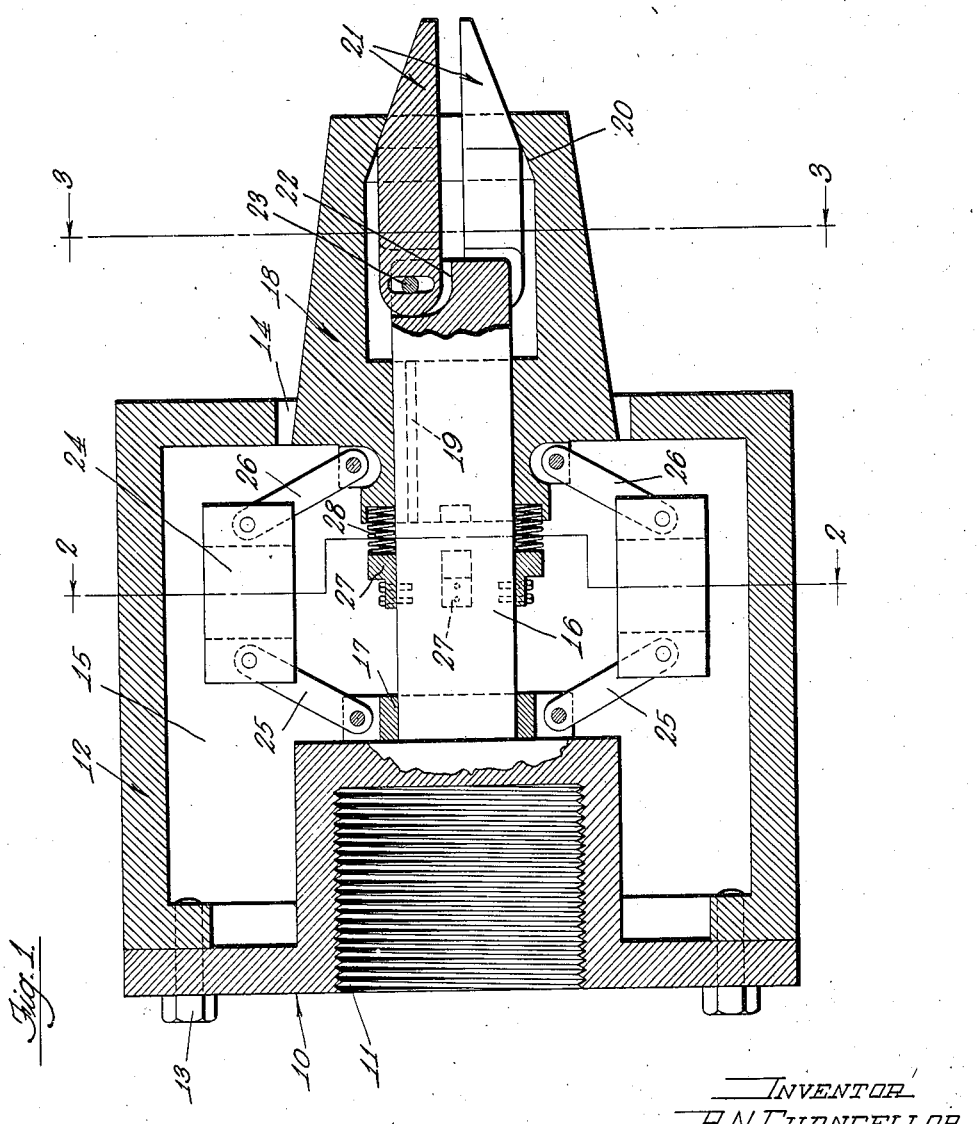
Fig. 1 is a vertical section through the centrifugal chuck.
Figure 2:
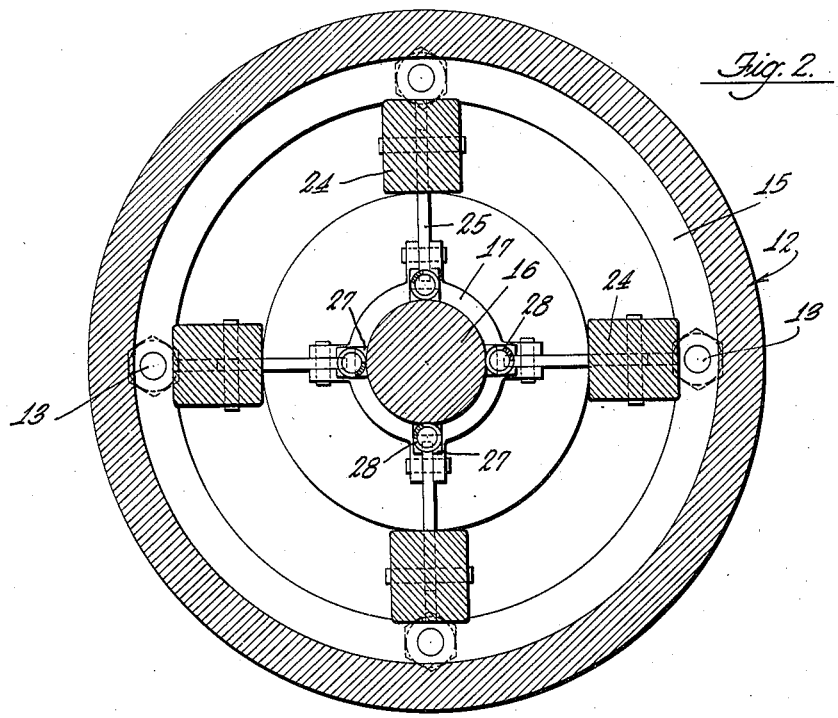
Fig. 2 is a transverse vertical section taken substantially upon the line 2—2 upon Fig. 1.
Figure 3:
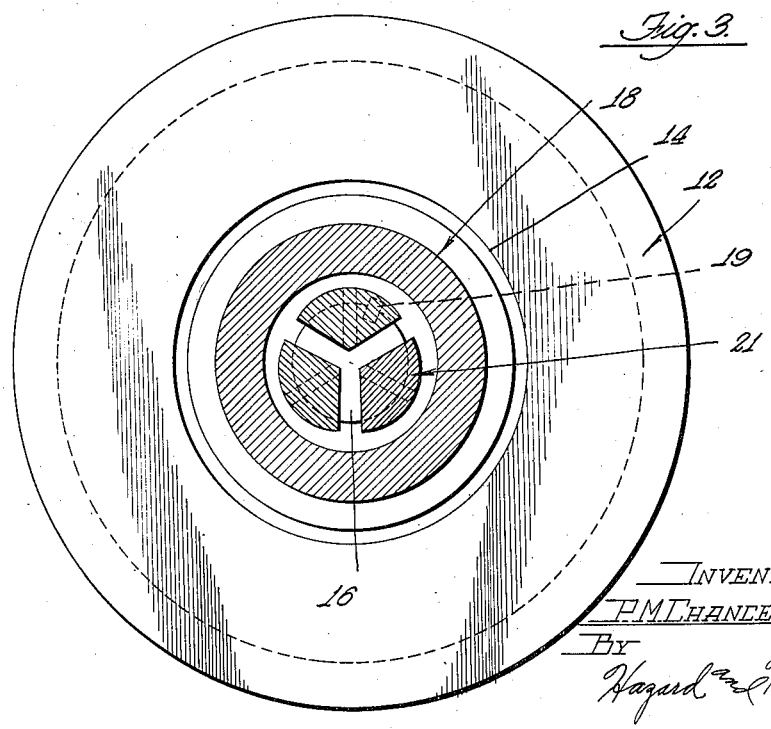
Fig. 3 is a transverse section taken substantially upon the line 3—3 of Fig. 1.

Referring to the accompanying drawings, wherein similar reference characters designate similar parts throughout, the improved chuck consists of a body which provides a housing. This body is illustrated as being made up of two parts, one designated at 10, which is somewhat similar to a face plate. Part 10 of the body is internally threaded as indicated at 11, providing for its application to a lathe spindle or the spindle of a rotary drilling press or, in fact, any suitable power driven rotary element. Any equivalent means to the threads 11 may be employed as a means for attaching the body to the rotary element, as occasion may require.

The second part of the body is indicated at 12, this part being fastened to part 10 by means of cap screws 13. The opposite end of part 12 is provided with an opening indicated at 14 and the interior of this part provides an angular space 15.

Part 10 carries an axial spindle 16 which is, preferably, integral therewith but which may be separate and rigidly attached thereto. On this spindle 16 there is secured a collar 17. On the opposite end of the spindle 16 there is slidably keyed a jaw-closing member or collar 18, the key for which is indicated in dotted lines on Fig. 1 by the reference character 19. This jaw-closing member is internally tapered as indicated at 20 so as to be engageable with the outer tapered surfaces of a plurality of jaws indicated at 21. These jaws may be of any preferred construction and in the form shown they have their inner ends disposed in recesses 22 in the forward end of spindle 16. The jaws have pin and slot connections indicated at 23 with the spindle.

Surrounding spindle 16 there are a plurality of weights 24, and while the number of these weights may vary the number illustrated is four. The ends of the weights are bifurcated to receive links. Associated with each weight 24 is a rear link 25 pivotally connecting the rear end of weight 24 with collar 17. A similar link 26 connects the forward end of each weight 24 with collar or jaw-closing member 18. Immediately behind jaw-closing member 18 a plurality of small brackets 27 are secured at regular intervals around spindle 16. These brackets constitute spring seats for coiled springs 28, which have their forward ends seated in recesses in the rear end of collar or jaw-closing member 18.

The operation and advantages of the improved chuck are as follows: When it is desired to mount an article in the chuck so as to be rotated thereby, the chuck is first applied to the lathe spindle or other rotary element. The article is then positioned between the jaws and the rotary element started, causing the chuck to turn. As soon as the chuck starts its rotation, the weights 24 become subject to and influenced by centrifugal forces, tending to throw these weights outwardly, similar to a fly ball governor. This results in the weights drawing jaw-closing member 18 rearwardly with the result that conical surface 20 engages the outer surfaces of the jaws 21 and causes them to contract about the article. The pin and slot connection indicated at 23 between each jaw and spindle 16 enables the jaws to accommodate themselves to a certain extent to the article placed therebetween. As the speed of rotation increases, the centrifugal forces increase with the result that the higher the speed the greater the force that is exerted by the jaw members on the article, it being understood that the forces exerted by the coiled springs 28 are easily overcome by the outward movement of the weights 24.

When the article has been gripped by the chuck, it may be ground or polished or any other work may be done upon it while it is being rotated. When the work is completed, the lathe spindle or other rotary element is stopped and the rotation decreases in speed, the centrifugal forces likewise decrease. Consequently, as the chuck approaches stopping position the coiled springs 28 become effective to force the jaw-closing member 18 outwardly, thus enabling the jaws to release the article and enabling the article to be removed from the jaws by hand.

By the improved chuck it will be noted that it is unnecessary to tighten each jaw against the article mounted between the jaws as in the conventional chuck, nor is it necessary to loosen the jaws in order to remove the article. The article is merely placed between the jaws, the chuck rotated, and the article automatically gripped, and when rotation is stopped the article is automatically released.

Any preferred jaw construction may be utilized. In that shown the sides of the jaws fit snugly between the sides of recesses 22 in the spindle so that the spindle transmits rotational forces directly to the jaws. The arrangement is such that when the jaws are completely collapsed they may be slid into or out of the rear end of the jaw contracting member 18 in assembling or disassembling the chuck.

From the above described construction it will be appreciated that the centrifugal chuck lends itself to work where it is desired to speedily mount small articles to be turned and to speedily remove them therefrom.

Various changes may be made in the details of construction without departing from the spirit or scope of the invention as defined by the appended claims.

I claim:

1. A centrifugal chuck comprising a body providing a housing, a spindle rigid with the housing, jaws carried by the spindle, weights in the housing, a jaw-closing member slidably keyed upon the spindle, and links connecting the weights to the housing and to the jaw-closing member whereby when the chuck is rotated the weights will by centrifugal action cause the jaw-closing member to contract the jaws.

2. A centrifugal chuck comprising a body providing a housing, a spindle rigid with the housing, jaws carried by the spindle, weights in the housing, a jaw-closing member slidably keyed upon the spindle, links connecting the weights to the housing and to the jaw-closing member whereby when the chuck is rotated the weights will by centrifugal action cause the jaw-closing member to contract the jaws, and spring means urging the jaw-closing member into jaw-releasing position.

3. A centrifugal chuck comprising a hollow body adapted to be applied to a rotatable element so as to be rotated thereby, a spindle rigid with the body, weights within the body and disposed about the spindle, a jaw-closing member slidably keyed to the spindle, a collar on the spindle, links connecting the weights to the collar and jaw-closing member, and jaws disposed within the jaw-closing member having pin and slot connections with the spindle.

4. A centrifugal chuck comprising a hollow body adapted to be applied to a rotatable element so as to be rotated thereby, a spindle rigid with the body, weights within the body and disposed about the spindle, a jaw-closing member slidably keyed to the spindle, a collar on the spindle, links connecting the weights to the collar and jaw-closing member, jaws disposed within the jaw-closing member having pin and slot connections with the spindle, brackets on the spindle, and springs compressed between the brackets and the jaw-closing member.

PHILIP M. CHANCELLOR.